United States Patent Office 3,288,757
Patented Nov. 29, 1966

3,288,757
PROCESS FOR PRODUCING POLYMERIC
PRODUCTS OF TRIOXANE
Walter Wilson, Cambridge, and Herbert May, Edgbaston, Birmingham, England, assignors to British Industrial Plastics Limited, London, England, a company of the United Kingdom
No Drawing. Filed Mar. 18, 1963, Ser. No. 266,069
Claims priority, application Great Britain, Mar. 19, 1962, 10,501/62, 10,502/62
14 Claims. (Cl. 260—67)

The present invention relates to the production of homopolymers and copolymers from trioxane using novel catalysts.

It is known that trioxane may be polymerized to high molecular weight polyoxymethylene, which is suitable for the manufacture of plastic moulding compositions and films, in the presence of electrophilic catalysts. U.K. patent specification No. 878,163 describes and claims the polymerization of trioxane to high molecular weight polyoxymethylene in the presence of an electrophilic catalyst. Particularly suitable catalysts for the polymerization, and which are described in the above-mentioned specification, are:

(i) Metal and metalloidal fluorides, chlorides and bromides, belonging to the general class of catalysts known as Friedel-Crafts catalysts;
(ii) Complexes or (i) with water or with organic compounds in which the donor atom is oxygen or sulphur;
(iii) Non-oxidizing inorganic acids and their complexes with trioxane, for example β-propio-lactone; δ-valerolac-
(iv) Complexes of boron trifluoride with very weakly basic nitrogen compounds in which the donor atom is nitrogen;
(v) Halogens and inter-halogen compounds; and
(vi) Oxonium salts.

Electrophilic catalysts, in particular the classes mentioned above, may also be used to prepare trioxane copolymers. Examples of suitable monomers which may be copolymerized with trioxane to yield useful polymeric products in the presence of electrophilic catalysts are cyclic ethers, for example ethylene oxide, propylene oxide and dioxolan; cyclic carboxylic esters which are substantially more reactive than γ-lactones when copolymerized with trioxane, for example β-propio-lactone; δ-valerolactone, and ε-caprolactone; aldehydes, for example chloral, anisaldehyde, and cinnamaldehyde; styrene and substituted styrenes, for example α-methyl styrene, anethole, 1- and 2-substituted vinyl napthalenes, stilbene, indene and acenaphthylene; vinyl ethers, for example isobutyl vinyl ether and methyl vinyl ether; N-vinyl and C-vinyl substituted derivatives of aromatic heterocyclic compounds, for example N-vinyl carbazole and 2-vinyl pyridine; ethylenically unsaturated aliphatic and alicyclic hydrocarbons, for example isobutene, butadiene and cyclohexene; allyl compounds, for example allyl ethers and allyl esters; isocyanates, for example phenyl isocyanate; and nitriles, for example acrylonitrile, adiponitrile and benzonitrile. Copolymers may also be prepared from trioxane and more than one of the above comonomers.

It has now been found that a further class of electrophilic catalysts is particularly useful for the polymerization, i.e. homopolymerization and copolymerization, of trioxane and result in polymeric products which have even better properties than those obtained using the classes of electrophilic catalyst described above.

These new catalysts are compounds having one of the following general formulae:

ROBF$_2$

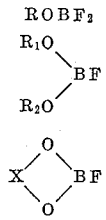

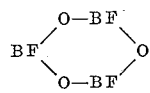

where R, R$_1$, R$_2$ (which may be the same or different are (a) Alkyl or substituted alkyl radicals, examples of such catalysts being n-butyl difluoroborinate, ethyl difluoroborinate, di(n-butyl)fluoroboronate, 2 - fluoropropyl difluororobinate and 2-fluoroethyl difluoroborinate;

(b) Alkylene or substituted alkylene radicals, examples of such catalysts being boron acetylacetone difluoroborinate and boron dibenzoyl methane difluoroborinate;

(c) Alkoxy or substituted alkoxy radicals, examples of such catalysts being (fluoromethoxy)ethyl difluoroborinate and (fluoromethoxy)methoxymethyl difluoroborinate; or (d) Aryl or substituted aryl radicals, examples of such catalysts being phenyl difluoroborinate and diphenyl fluoroboronate;

And X is any of the above radicals or an inorganic radical, an example of such a catalyst being the cylic trimer

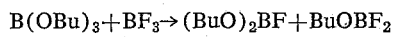

According to the present invention, therefore, a process for the preparation of polymers or polymeric products comprises polymerizing trioxane, with or without a comonomer such as hereinbefore mentioned by way of example, under substantially anhydrous conditions in the presence of a catalyst as hereinbefore defined.

It should also be stated that the solvated species of these catalysts are also useful in the process of the present invention. It will be appreciated that the radical X, which might suitably be termed a bridging group, should contain two free bonds, in order to bond to the two oxygen atoms and thus complete the ring.

The products produced by the polymerization and copolymerization of trioxane in the presence of these new catalysts have superior properties to those products produced using the catalysts described in U.K. patent specification No. 878,163, for instance they exhibit higher molecular weight and higher thermal stability.

A further advantage of using the catalysts of the invention is that they are simple to prepare. For example, n-butyl difluoroborinate and di-n-butyl fluoroboronate can be prepared by the method of Cook, Ilett, Saunders and Stacey in Journal of Chemical Society (1950), 3125, namely by the action of boron trifluoride on tri-n-butyl borate;

B(OBu)$_3$+BF$_3$→(BuO)$_2$BF+BuOBF$_2$

The two compounds may be separated from each other by fractionation under reduced pressure, or it may be convenient to use a mixture of the two compounds in-steam of separating them.

The difluoroborinates are particularly advantageous to use since they have excellent storage stability. This is in contrast to many of the electrophilic catalysts described in U.K. patent specification No. 878,163—for example, boron trifluoride-diethyl etherate and boron trifluoride-dibutyl etherate, which darken on standing, rapidly when exposed to light, and less rapidly when in the dark. The fluoroboronates are, however, somewhat unstable unless some stabilizing influence is present, for example the six-membered ring compound and they decompose by disproportionation

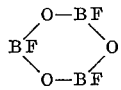

to the difluoroborinate and borate—the former of which is catalytically active and the latter inert.

The polymerization or copolymerization reaction is preferably effected in the presence of an inert liquid medium. This inert medium, which should be well dried, enables the reaction to be carried out in a controlled manner by ensuring uniform distribution of the catalyst and reactants and by facilitating dissipation of the heat of reaction. The use of a liquid medium is also advantageous in giving the product in the form of an easily handled slurry. The inert liquid medium may be one in which the trioxane, other reactants when present, and the catalysts are dissolved at the temperature employed. One or more of the reactants may, however, be dispersed or partly dispersed and partly dissolved in a finely divided form in the liquid medium. Examples of suitable inert liquid media are saturated aliphatic and cycloaliphatic hydrocarbons, chlorinated aliphatic and cycloaliphatic hydrocarbons such as dichloromethane, aliphatic and aromatic nitro-hydrocarbons and carboxylic esters. Particularly advantageous results have been obtained using n-hexane which dissolves a minor proportion of the trioxane, and light petroleum fractions in the hexane range which have a boiling point between 60 and 70° C. and which consist mainly of normal paraffins have also been used with success. If, however, the other reactant or reactants are soluble in or miscible with molten trioxane, the reaction may be effected without the use of such an inert liquid medium.

The reaction may be carried out at a temperature between —100 and 100° C., and preferably between 0 and 70° C. The amount of other reactants used may vary from 0.1 to about 50% by weight, but the preferred amount is from 0.5 to 20% by weight of the total weight of the reactants. As hereinbefore stated, the reaction must be carried out under substantially anhydrous conditions and most satisfactory results are obtained when the water content of the reaction system is less than 0.1%, preferably less than 0.05% by weight.

As the reaction proceeds, fresh trioxane and other reactants may be continuously or progressively introduced into the reaction zone in which the catalyst is already present or into which the catalyst is likewise continuously or progressively induced.

If desired, the reaction can be carried out as a completely continuous process by continuously or progressively withdrawing the polymeric product which is produced.

The reaction is preferably carried out under a dry atmosphere which is inert with respect to the reaction, such as nitrogen and/or carbon dioxide, suitably at atmospheric pressure although higher pressures may be employed.

It should be further noted that the other reactants, when copolymerization is taking place, may be partially polymerised prior to their reaction with the trioxane. For example, styrene, or a styrene derivative may be partially polymerized in solution with the catalyst in an inert liquid medium such as hexane, and the solution of styrene partial polymer containing the catalyst added to a dispersion of trioxane in an inert liquid medium, such as hexane.

The reaction of comonomers with partially polymerized trioxane has, however, proved difficult in view of the rapidity of the polymerization reaction of trioxane.

At the end of the reaction, an organic solvent such as acetone or dichloromethane or an aqueous solution of a suitable complexing agent for the boron-containing catalyst residues may be added and the polymeric product filtered off and washed with more solvent or solution. The purpose of this washing is to remove any unreacted trioxane, and to remove at least part of the catalyst residues.

It is important to effect a substantially complete removal of catalyst residues from the polymeric material and this removal can advantageously be carried out by reducing the polymeric product into a finely divided state—on a large scale suitably by ball-milling in the presence of an aqueous solution of ammonia or on a small scale suitably by the use of a high speed homogenizer in the presence of an aqueous solution of ammonia.

The thermal stabilities of the products of the present invention, as expressed by the rate of loss of weight at 222° C. ($K_{222}$) and measured by the method described by Schweitzer, Macdonald and Punderson in the Journal of Applied Polymer Science, 1959, 1, 160, are such that in some cases the product can be used without further stabilization. However, some products do require further stabilization and others benefit by such stabilization insofar as their initial thermal stabilities, as determined by the percentage loss of weight during the first 30 minutes of heating at 220° C., are improved. It is important for the products to have a high thermal stability if they are to be molded by conventional molding processes.

Such further stabilization of the products can be obtained by incorporating therein substances which react with any free end groups, and typically reactive substances for this purpose are identified in U.K. patent specification No. 557,873 and include acid anhydrides and isocyanates.

The products obtainable by the present invention are preferably stabilized by the incorporation therein of antioxidants. Suitable antioxidants are aromatic amines, such as N-phenyl-1-naphthylamine, N-phenyl-2-naphthylamine, diphenylamine and di-2-naphthyl p-phenylene diamine; bisphenols, such as 2,6-bis(2'-hydroxy-3'-tert-butyl-5'-methylbenzyl)-4-methyl-phenol; ultra-violet light-absorbing substances, for example substituted benzophenones such as 2,2'-dihydroxy-4,4'-dimethoxy-benzophenone and 2-hydroxy-4-methoxybenzophenone. The products may also be stabilized by the incorporation therein of such stabilizers as hydrazines, ureas and thioureas such as ethylene urea and phenyl thiourea, phenols such as 2-methyl-4,6-di-tertbutyl phenol and polyamines.

Further stabilization of the products may be effected by incorporating therein a polymeric substance containing —CO—NH— groups. Examples of suitable polymeric substances which can be used for this purpose are polyamides, polyurethanes, polyureas, polyacrylamides and polypeptides.

Although the polymeric products stabilized by the above methods can usefully be used for the production of plastic molding compositions, films, fibers and protective coatings, they may possess the disadvantage to a varying degree of evolving gas during normal injection molding. This liberation of gas causes the formation of bubbles and faults in molded products and, in order to avoid this evolution of gas, it is advantageous to heat treat the product. The heat treatment consists in heating the polymeric product at an elevated temperature, generally above the melting-point of the product and conveniently in the presence of stabilizers such as those described above. At higher temperatures it is preferable to effect the heat treatment in an inert atmosphere, for example in an atmosphere of nitrogen and/or carbon dioxide.

The polymeric products formed by the process of the invention are useful in the manufacture of plastic molding compositions, films, fibers and protective coatings and, for such applications, the products may be mixed with lubricants, fillers and pigments in addition to the antioxidants and stabilizers hereinbefore mentioned.

The invention is illustrated by the following examples in which the thermal decomposition rates ($K_{222}$) were determined by the method described by Schweitzer et al. in the aforementioned journal, and in which the inherent viscosities are as measured at 60° C. as 0.5% by weight solutions in p-chlorophenol containing 2% by weight alpha-pinene. Several examples using the electrophilic catalysts described in U.K. patent specification No. 878,163 have been included for purposes of comparison.

*Example 1*

Into a 100 ml. reaction vessel were charged 20 g. trioxane and 10 g. cyclohexane. The water content of the reaction mixture was less than 0.01% by weight, as determined by the Karl Fischer method.

The mixture was maintained at 60° C. in an atmosphere of dry nitrogen and 0.01 g. (n-BuO)$BF_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C.

A flexible film was obtained by compression molding at 190° C. which exhibited a thermal decomposition rate of 0.72% per minute.

*Example 2*

Into a 100 ml. reaction vessel were charged 20 g. trioxane and 10 g. cyclohexane. The water content of the reaction mixture was less than 0.01% by weight, as determined by the Karl Fischer method.

The mixture was maintained at 60° C. in an atmosphere of dry nitrogen and 0.01 g. (n-BuO)$_2$BF was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogeniser in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C.

A flexible film was obtained by compression molding at 190° C. which exhibited a thermal decomposition rate of 0.66% per minute.

*Example 3*

A 2 liter reaction flask, fitted with a thermometer, a stirrer, a gas inlet and outlet and a condenser, was heated to remove any moisture which was present and then cooled in a stream of pure dry nitrogen. Into the flask there were charged 600 g. trioxane and 400 g. hexane, the water content of this reaction mixture being less than 0.01% by weight as determined by the Karl Fischer method. To the mixture which was rapidly agitated, there was added in an atmosphere of dry nitrogen 0.25 ml. (n-BuO)$BF_2$. Polymerization took place rapidly and the completion of the reaction was indicated by a drop in temperature.

After completion of the polymerization, about 300 ml. acetone containing about 10% by volume triethylamine was added with vigorous agitation. The resulting slurry was filtered and ball-milled for about 16 hours with about 2 liters of approximately 2% by weight aqueous ammonia. The polymeric product was filtered, washed with about 2 liters of approximately 0.3% by weight hot aqueous ammonia then washed wtih about 2 litres acetone and finally dried in a vacuum oven at 60° C.

A yield of 400 g. polymer was obtained which had an inherent viscosity of 1.63. On compression molding at 190° C., a flexible film was obtained, which exhibited a thermal decomposition rate of 0.60% per minute.

*Example 4*

Into a 250 ml. reaction vessel were charged 5 g. trioxane and 100 ml. dichloromethane. The water content of the reaction mixture was less than 0.01% by weight, as determined by the Karl Fischer method. The mixture was maintained at −78° C. in an atmosphere of dry nitrogen and 0.1 g. (n-BuO)$BF_2$ was added with vigorous agitation.

After 8 hours about 20 ml. acetone containing about 10% by volume triethylamine was added. The mixture was filtered and the product subjected to a high-speed homogenizer in the presence of about 70 ml. of approximately 2% by weight aqueous ammonia. The polymeric product was filtered, washed with about 70 ml. of approximately 0.3% by weight aqueous ammonia, followed by about 70 ml. acetone and finally dried in a vacuum oven at 60° C. A solid product, useful for molding, was obtained.

*Example 5*

Into a 100 ml. reaction vessel were charged 20 g. trioxane, 0.4 g. β-propiolactone and 10 g. cyclohexane. The water content of the reaction mixture was less than 0.01% by weight, as determined by the Karl Fischer method.

The mixture was maintained at 60° C. in an atmosphere of dry nitrogen and 0.01 g. (n-BuO)$BF_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C.

A flexible film was obtained by compression molding at 190° C. which exhibited a thermal decomposition rate of 0.33% per minute.

*Example 6*

Into a 100 ml. reaction vessel were charged 20 g. trioxane, 0.4 g. styrene and 10 g. cyclohexane. The water content of the reaction mixture was less than 0.01% by weight, as determined by the Karl Fischer method.

The mixture was maintained at 60° C. in an atmosphere of dry nitrogen and 0.01 g. (n-BuO)$BF_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C.

A brittle film was obtained by compression molding at 190° C. which exhibited a thermal decomposition rate of 0.42% per minute.

*Example 7*

Into a 100 ml. reaction vessel were charged 20 g. trioxane, 0.4 g. 2-vinyl-1,3-dioxane and 10 g. cyclohexane.

The water content of the reaction mixture was less than 0.01% by weight, as determined by the Karl Fischer method.

The mixture was maintained at 60° C. in an atmosphere of dry nitrogen and 0.01 g. (n-BuO)$BF_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogeniser in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C.

A flexible film was obtained by compression molding at 190° C. which exhibited a thermal decomposition rate of 0.38% per minute.

*Example 8*

A 2 liter reaction flask, fitted with a thermometer, a stirrer, a gas inlet and outlet and a condenser, was heated to remove any moisture which was present and then cooled in a stream of pure dry nitrogen. Into the flask, there were charged 600 g. trioxane, 10 g. β-propiolactone and 400 g. hexane, the water content of this reaction mixture being less 0.01% by weight, as determined by the Karl Fischer method. To the mixture, which was rapidly agitated, there was added in an atmosphere of dry nitrogen, 0.25 ml. (n-BuO)$BF_2$. Polymerization took place rapidly and the completion of the reaction was indicated by a drop in temperature.

After completion of the polymerization, about 300 ml. acetone containing about 10% by volume triethylamine was added with vigorous agitation. The resulting slurry was filtered and ball-milled for about 16 hours with about 2 liters of approximately 2% by weight aqueous ammonia. The polymeric product was filtered, washed with water about 2 liters of approximately 0.3% by weight hot aqueous ammonia, then with about 2 liters acetone and finally dried in a vacuum oven at 60° C.

A yield of 510 g. polymer was obtained which had an inherent viscosity of 1.2. On compression molding at 190° C., a flexible film was obtained, which exhibited a thermal decomposition rate of 0.15% per minute. A sample of the polymer was stabilized by the incorporation of 0.5% by weight 2,6-bis(2'-hydroxy-3'-tert-butyl-5'-methyl benzyl)-4-methyl phenol and 1% by weight malonamide and the thermal decomposition rate of a film molded from the product was 0.10% per minute. A sample of this was further stabilized by heating it in air at 200° C. for 30 minutes and, on molding, gave a film having a thermal decomposition rate of 0.07% per minute.

*Example 9*

A 2 liter reaction flask, fitted with a thermometer, a stirrer, a gas inlet and outlet and a condenser, was heated to remove any moisture which was present and then cooled in a stream of pure dry nitrogen. Into the flask, there were charged 600 g. trioxane, 10 g. 1,3-dioxolane and 400 g. hexane, the water content of this reaction mixture being less than 0.01% by weight, as determined by the Karl Fischer method. To the mixture, which was rapidly agitated, there was added in an atmosphere of dry nitrogen 0.25 ml. (n-BuO)$BF_2$. Polymerization took place rapidly and the completion of the reaction was indicated by a drop in temperature.

After completion of the polymerization, about 300 ml. acetone containing about 10% by volume triethylamine was added with vigorous agitation. The resulting slurry was filtered and ball-milled for about 16 hours with about 2 liters of approximately 2% by weight aqueous ammonia. The polymeric product was filtered, washed with about 2 liters of approximately 0.3% by weight hot aqueous ammonia, then with about 2 liters acetone and finally dried in a vacuum oven at 60° C.

A yield of 410 g. polymer was obtained which had an inherent viscosity of 1.0. On compression molding at 190° C., a brittle film was obtained, which exhibited a thermal decomposition rate of 0.22% per minute.

*Example 10*

Into a 100 ml. reaction vessel were charged 20 g. trioxane, 0.4 g. 1,3-dioxolane, 0.2 g. styrene and 10 g. cyclohexane. The water content of the reaction mixture was less than 0.01% by weight, as determined by the Karl Fischer method.

The mixture was maintained at 60° C. in an atmosphere of dry nitrogen and 0.01 g. of (n-BuO)$BF_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C. The polymer product had an inherent viscosity of 1.1.

A partly flexible film was obtained by compression molding at 190° C. which exhibited a thermal decomposition rate of 0.22% per minute.

*Example 11*

Into a 100 ml. reaction vessel were charged 20 g. trioxane, 0.3 g. allyl benzene and 10 g. cyclohexane. The water content of the reaction mixture was less than 0.01% by weight, as determined by the Karl Fischer method.

The mixture was maintained at 60° C. in an atmosphere of dry-nitrogen and a mixture of 0.01 g. (n-BuO)$BF_2$ and 0.5 g. n-$Bu_2O$ was added with vigorous agitation. Polymerization took palce rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C. The polymeric product had an inherent viscosity of 1.55.

A partly flexible film was obtained by compression molding at 190° C. which exhibited a thermal decomposition rate of 0.68% per minute.

*Example 12*

Into a 100 ml. reaction vessel were charged 20 g. trioxane, 0.5 g. acrylonitrile and 10 g. cyclohexane. The water content of the reaction mixture was less than 0.01% by weight, as determined by the Karl Fischer method.

The mixture was maintained at 60° C. in an atmosphere of dry nitrogen and a mixture of 0.01 g. (n-BuO)$_2$BF and 0.01 g. $SnCl_4$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C. The polymer product had an inherent viscosity of 0.66.

A film was obtained by compression molding at 190° C.

*Example 13*

Into a 100 ml. reaction vessel were charged 20 g. trioxane and 0.5 g. vinyl-2-ethylhexyl ether and 10 g. cyclohexane. The water content of the reaction mixture was less than 0.01% by weight, as determined by the Karl Fischer method.

The mixture was maintained at 60° C. in an atmosphere of dry nitrogen and a mixture of 0.01 g. (n-BuO)$_2$BF and 0.5 g. n-Bu$_2$O was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C.

A flexible film was obtained by compression molding at 190° C. which exhibited a thermal decomposition rate of 0.42% per minute.

*Example 14*

Into a 100 ml. reaction vessel were charged 20 g. trioxane, 0.5 g. styrene and 10 g. cyclohexane. The water content of the reaction mixture was less than 0.01% by weight, as determined by the Karl Fischer method.

The mixture was maintained at 60° C. in an atmosphere of dry nitrogen and 0.01 g. (n-BuO)BF$_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C. The polymeric product had an inherent viscosity of 1.09.

A partly flexible film was obtained by compression molding at 190° C. which exhibited a thermal decomposition rate of 0.45% per minute.

*Example 15*

Into a 100 ml. reaction vessel were charged 20 g. trioxane, 1 g. styrene and 10 g. cyclohexane. The water content of the reaction mixture was less than 0.01% by weight, as determined by the Karl Fischer method.

The mixture was maintained at 60° C. in an atmosphere of dry nitrogen and 0.01 g. (n-BuO)BF$_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C. The polymeric product had an inherent viscosity of 0.95.

A partly flexible film was obtained by compression molding at 190° C. which exhibited a thermal decomposition rate of 0.22% per minute.

*Example 16*

Into a 100 ml. reaction vessel were charged 20 g. trioxane, 2 g. styrene and 10 g. cyclohexane. The water content of the reaction mixture was less than 0.01% by weight, as determined by the Karl Fischer method.

The mixture was maintained at 60° C. in an atmosphere of dry nitrogen and 0.01 g. (n-BuO)BF$_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3 by weight aqueous ammonia and then with about 250 ml. acetone and finally dried in a vacuum oven at 60° C. The polymeric product had an inherent viscosity of 1.0.

A partly flexible film was obtained by compression molding at 190° C. which exhibited a thermal decomposition rate of 0.15% per minute.

*Example 17*

Into a 100 ml. reaction vessel were charged 20 g. trioxane, 0.4 g. N-vinyl carbazole and 10 g. cyclohexane. The water content of the reaction mixture was less than 0.01% by weight, as determined by the Karl Fischer method.

The mixture was maintained at 60° C. in an atmosphere of dry nitrogen and 0.01 g. (n-BuO)BF$_2$ was added with vigorous agitation. Polymerization took place rapidly and the completion of the reaction was indicated by a drop in temperature.

After completion of the polymerization, about 50 ml. acetone containing about 10% by volume triethylamine was added. The resulting slurry was filtered and the product subjected to a high-speed homogenizer in the presence of about 250 ml. of approximately 2% by weight aqueous ammonia. The polymeric product was filtered, washed with about 250 ml. of approximately 0.3% by weight aqueous ammonia and then with about 250 ml. acetone and finally dried in a vacuum oven at 60° C. The polymer product had an inherent viscosity of 1.55.

A partly flexible film was obtained by compression molding at 190° C. which exhibited a thermal decomposition rate of 1.0% per minute.

*Example 18*

Into a 250 ml. reaction vessel were charged 5 g. trioxane, 5 g. styrene and 100 ml. dichloromethane. The water content of the reaction mixture was less than 0.01% by weight, as determined by the Karl Fischer method. The mixture was maintained at −78° C. in an atmosphere of dry nitrogen and 0.1 g. (n-BuO)BF$_2$ was added with vigorous agitation.

After 8 hours about 20 ml. acetone containing about 10% by volume of triethylamine was added. The mixture was filtered and the product subjected to a high-speed homogenizer in the presence of about 70 ml. of approximately 2% by weight aqueous ammonia. The polymeric product was filtered, washed with about 70 ml. of approximately 0.3% by weight aqueous ammonia, and then with about 70 ml. acetone and finally dried in a vacuum oven at 60° C. 3 g. of solid product, useful for molding, was obtained.

Example 19

(i) Into a 2 liter reaction vessel were charged 600 g. trioxane, 12 g. beta-propiolacetone and 600 g. cyclohexane, the water content of this reaction mixture being less than 0.01% by weight as determined by the Karl Fischer method. To the rapidly agitated mixture, which was maintained at 65° C., there was added, in an atmosphere of dry nitrogen, 0.35 ml. BuOBF$_2$. Polymerization was carried out for 3 hours.

After completion of the polymerization, about 300 mls. acetone containing about 10% by volume triethylamine were added with vigorous agitation. The resulting slurry was filtered and ball-milled for 16 hours with about 2 liters of approximately 2% by weight aqueous ammonia. The polymeric product was filtered, washed with about 2 liters of approximately 0.3% by weight hot aqueous ammonia, and then with about 2 liters acetone and finally dried in a vacuum oven at 60° C.

(ii) Polymerization was effected in an identical system to (i) except that 0.30 mls. boron trifluoride-di-ethyl etherate was used as catalyst. Identical washing procedure was used as in (i).

The polymers obtained in (i) and (ii) exhibited the following characteristics:

|  | (i) 0.35 ml. BuOBF$_2$ | (ii) 0.30 ml. BF$_3$.OEt$_2$ |
|---|---|---|
| $W^{10}_{222}$ | 1.0 | 5.2 |
| $W^{30}_{222}$ | 5.0 | 9.7 |
| $\eta$inh | 1.10 | 1.0 |
| $k_{222}$ | 0.17 | 0.23 |

The above W values are the percent weight losses sustained by the polymer on heating at 222° C. for 10 minutes and 30 minutes respectively.

Example 20

Into a 100 ml. reaction vessel were charged 20 g. trioxane, 10 g. cyclohexane and 0.4 g. styrene. The water content of the reaction mixture was less than 0.01% by weight as determined by the Karl Fischer method.

The mixture was maintained at 60° C. in an atmosphere of dry nitrogen, and 0.01 g. BuOBF$_2$ was added with vigorous agitation. Polymerization was effected for 3 hours. After completion of the polymerization, about 50 mls. acetone, containing about 10% by volume triethylamine was added. The resulting slurry was filtered, and the product subjected to a high speed homogenizer in the presence of about 250 mls. of approximately 2% by weight aqueous ammonia. The polymeric product was filtered, washed with about 250 mls. of approximately 0.3% by weight aqueous ammonia and then with about 250 mls. acetone, and finally dried in a vacuum oven at 60° C. A flexible film was obtained by compression moulding at 190° C.

Polymerization was effected in an identical fashion using 0.01 g. boron trifluoride-di-butyl etherate and 0.01 g. boron trifluoride di-ethyl etherate as catalysts. The polymers obtained exhibited the following characteristics:

|  | BuOBF$_2$ | BF$_3$.OBu$_2$ | BF$_2$.OEt$_3$ |
|---|---|---|---|
| $W^{10}_{222}$ | 5.6 | 6.2 | 8.1 |
| $W^{30}_{222}$ | 14.9 | 16.3 | 18.0 |

Example 21

Polymerization was carried out in an identical fashion to Example 20 except that 0.25 g. dioxolane and 0.25 g. styrene were used as comonomers instead of the previous 0.4 g. styrene. The polymer obtained using the three different catalysts of Example B exhibited the following characteristics:

|  | BuOBF$_2$ | BF$_3$.OBu$_2$ | BF$_3$.OEt$_2$ |
|---|---|---|---|
| $W^{30}_{222}$ | 8.1 | 10.1 | 12.1 |

Example 22

Into a 100 ml. reaction vessel were charged 20 g. trioxane, 0.25 g. dioxolane, 0.25 g. styrene and 10 g. cyclohexane. The water content of the reaction mixture was less than 0.01% by weight as determined by the Karl Fischer method.

The mixture was maintained at 60° C. in an atmosphere of dry nitrogen and 0.01 g. boron di-benzoyl methane difluoroborinate was added with vigorous agitation.

After a period of 16 hours about 50 mls. acetone containing about 10% by volume triethylamine was added the resulting slurry was filtered and the product subjected to a high speed homogenizer in the presence of about 250 mls. of approximately 2% by weight aqueous ammonia. The polymeric product was filtered, washed with about 250 mls. of approximately 0.3% by weight aqueous ammonia and then with about 250 mls. acetone and finally dried in a vacuum oven at 60° C.

Polymerization was effected in an identical manner to that described above, except that 0.01 g. boron trifluoride-di-ethyl etherate was used as catalyst. The polymer obtained in each case exhibited the following characteristics:

|  | Boron dibenzoyl methane difluoroborinate | BF$_3$.OEt$_2$ |
|---|---|---|
| $k_{222}$ | 0.10 | 0.23 |
| $\eta$inh | 1.25 | 0.95 |

The above $k$ values were determined from films molded from polymer samples.

Example 23

Polymerization was carried out in an identical fashion to Example 22, except that 0.01 g. boron acetyl acetone difluoroborinate were used as catalyst.

The polymer obtained exhibited the following characteristics:

Boron acetyl acetone difluoroborinate $k_{222}$ ———————————————————————— 0.17
$\eta$inh. ———————————————————————— 1.20

Example 24

Into a 100 ml. reaction vessel were charged 20 g. trioxane and 10 g. cyclohexane. The water content of the reaction mixture was less than 0.01% by weight as determined by the Karl Fischer method.

The mixture was maintained at 65° C. in an atmosphere of dry nitrogen and 0.05 g. 2-fluoropropyl difluoroborinate was added with vigorous agitation. A solid polymer useful for molding was obtained.

Example 25

Into a 100 ml. reaction vessel were charged 20 g. trioxane and 10 g. cyclohexane. The water content of the reaction mixture was less than 0.01% by weight as determined by the Karl Fischer method.

The mixture was maintained at 65° C. in an atmosphere of dry nitrogen and 0.05 g. (fluoromethoxy) ethyl difluoroborinate was added with vigorous agitation. A solid polymer useful for molding was obtained.

Example 26

Into a 100 ml. reaction vessel were charged 20 g. trioxane and 10 g. cyclohexane. The water content of the reaction mixture was less than 0.01% by weight as determined by the Karl Fischer method.

The mixture was maintained at 65° C. in an atmosphere of dry nitrogen and 0.05 g. (fluoromethoxy) methoxymethyl difluoroborinate was added with vigorous agitation. A solid polymer useful for molding was obtained.

Example 27

Into a 100 ml. reaction vessel were charged 20 g. trioxane and 10 g. cyclohexane. The water content of the reaction mixture was less than 0.01% by weight as determined by the Karl Fischer method.

The mixture was maintained at 60° C. in an atmosphere of dry nitrogen and 0.05 g. phenyl difluoroborinate was added with vigorous agitation. A solid polymer useful for molding was obtained.

Example 28

Into a 100 ml. reaction vessel were charged 20 g. trioxane and 10 g. cyclohexane. The water content of the reaction mixture was less than 0.01% by weight as determined by the Karl Fischer method.

The mixture was maintained at 65° C. in an atmosphere of dry nitrogen and 0.01 g.

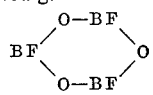

was added with vigorous agitation.

A solid polymer suitable for molding was obtained.

Example 29

Into a 100 ml. reaction vessel were charged 20 g. trioxane, 0.5 g. dioxolane and 14 g. cyclohexane. The water content of the reaction mixture was less than 0.01% by weight as determined by the Karl Fischer method.

The mixture was maintained at 65° C. in an atmosphere of dry nitrogen and 0.05 g. ethyl difluoroborinate was added with vigorous agitation. After completion of the polymerization, about 50 mls. acetone containing about 10% by volume triethylamine was added. The resulting slurry was filtered and the product subjected to a high speed homogeniser in the presence of about 250 mls. of approximately 2% by weight aqueous ammonia. The polymeric product was filtered, washed with about 250 ml. approximately 0.3% by weight aqueous ammonia, and then with about 250 mls. acetone and finally dried in a vacuum oven at 60° C. The polymer obtained had an inherent viscosity of about 1.

A flexible film was obtained by compression molding at 190° C. which exhibited a thermal decomposition rate of 0.19% per minute.

Example 30

Polymerization was effected in an identical fashion to the Example 29 except that no dioxolane was added as comonomer. The polymer produced had an inherent viscosity of about 1.

A flexible film, obtained by compression molding at 190° C. exhibited a thermal decomposition rate of 0.3% per minute.

What we claim is:

1. A process for the preparation of a trioxane polymer comprising polymerizing trioxane, with from 0 to about 50% of a comonomer, at a temperature of −100 to 100° C. under substantially anhydrous conditions in the presence of an electrophilic catalyst in which the catalyst is a compound having a formula selected from the group consisting of $ROBF_2$

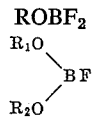

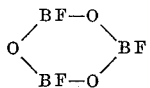

wherein R is one of the following:
(i) an alkyl radical;
(ii) a fluoro-substituted alkyl radical;
(iii) a fluoro-substituted alkoxy alkyl radical;
(iv) an alkoxy radical;
(v) an aryl radical;
(vi) a radical having the formula X·CO·CH=CY— wherein X and Y are selected from the group consisting of aryl and alkyl radicals;

and $R_1$ and $R_2$ are each selected from the group consisting of alkyl, alkoxy, aryl radicals.

2. A process according to claim 1, in which the catalyst is a compound selected from the group consisting of n-butyl difluoroborinate, ethyl difluoroborinate, di(n-butyl) fluoroboronate, 2-fluoropropyl difluoroborinate and 2-fluoroethyl difluoroborinate.

3. A process according to claim 1, in which the catalyst is a compound selected from the group consisting of acetylacetone difluoroborinate and dibenzoyl methane difluoroborinate.

4. A process according to claim 1, in which the catalyst is a compound selected from the group consisting of (fluoromethoxy)ethyl difluoroborinate and (fluoromethoxy) methoxymethyl difluoroborinate.

5. A process according to claim 1, in which the catalyst is a compound selected from the group consisting of phenyl difluoroborinate and diphenyl fluoroboronate.

6. A process according to claim 1, in which the solvated species of the catalyst is used.

7. A process according to claim 1, in which a mixture of catalysts is used.

8. A process according to claim 1, in which the comonomer is a compound selected from the group consisting of cyclic ethers, cyclic carboxylic esters, aldehydes, a styrene, vinyl ethers, N-vinyl and C-vinyl substituted derivatives of aromatic heterocyclic compounds, ethylenically unsaturated aliphatic and alicyclic hydrocarbons, allyl compounds selected from the group consisting of allyl esters and allyl ethers, isocyanates and nitriles.

9. A method of producing a polymerization product consisting essentially in heating trioxane in an inert solvent containing not more than 0.01% by weight of water at a temperature between 0° C. and 70° C., in the presence of a catalytic amount of n-butyl difluoroborinate, under vigorous agitation, to form a polymerization product, and recovering said product.

10. A method of producing a polymerization product consisting essentially in heating trioxane in an inert solvent containing not more than 0.01% by weight of water, with from 0.5 to 20% by weight of the total weight of reactants of a compound selected from the class consisting of cyclic ethers, cyclic carboxylic esters, aldehydes, a styrene, vinyl ethers, N-vinyl and C-vinyl substituted derivatives of aromatic heterocyclic compounds, ethylenically unsaturated aliphatic and alicyclic hydrocarbons, allyl compounds selected from the group consisting of allyl esters and allyl ethers, isocyanates and nitriles, at a temperature between 0° C. and 70° C., in the presence of a catalytic amount of n-butyl difluoroborinate, under vigorous agitation, to form a polymerization product, and recovering sad product.

11. A method of producing a polymerization product consisting essentially in heating trioxane in an inert solvent containing not more than 0.01% by weight of water, with from 0.5 to 20% by weight of the total weight of reactants of styrene, at a temperature between 0° C. and 70° C., in the presence of a catalytic amount of n-butyl difluoroborinate, under vigorous agitation, to form a polymerization product, and recovering said product.

12. A method of producing a polymerization product consisting essentially in heating trioxane in an inert solvent containing not more than 0.01% by weight of water, with from 0.5 to 20% by weight of the total weight of reactants of β-propiolactone, at a temperature between 0° C. and 70° C., in the presence of a catalytic amount of n-butyl difluoroborinate, under vigorous agitation, to form a polymerization product, and recovering said product.

13. The method of producing a polymerization product in which 20 g. of trioxane is heated in 10 g. of cyclohexane and the water content of the reaction mixture is less than 0.01% by weight, at a temperature of 60° C. in an atmosphere of dry nitrogen and in the presence of 0.01 g. of n-butyl difluoroborinate, under vigorous agitation to form a polymerization product, and recovering said product.

14. The method of producing a polymerization product in which 20 g. trioxane and 0.4 g. β-propiolactone are heated in 10 g. cyclohexane and the water content of the reaction mixture is less than 0.01% by weight, at a temperature of 60° C. in an atmosphere of dry nitrogen and in the presence of 0.01 of n-butyl difluoroborinate under vigorous agitation to form a polymerization product, and recovering said product.

References Cited by the Examiner

UNITED STATES PATENTS

| | | | |
|---|---|---|---|
| 3,026,299 | 3/1962 | Kray et al. | 260—67 |
| 3,027,352 | 3/1962 | Walling et al. | 260—67 |
| 3,087,913 | 4/1963 | Kray et al. | 260—67 |

OTHER REFERENCES

Kern et al.: Angewandte Chemie, 73, No. 6, pp. 177–186 (March 21, 1961).

Kunststoffe: Vol. 53, July 1963, pp. 11–21 English translation from Kunstsoffe, vol. 53 (1963), pp. 424–436.

Cook et al.: Chemical Society Journal, Part IV (1950), pp. 3125–3128.

WILLIAM H. SHORT, *Primary Examiner.*

SAMUEL H. BLECH, *Examiner.*

L. M. MILLER, *Assistant Examiner.*